US006947818B1

(12) United States Patent
Li

(10) Patent No.: US 6,947,818 B1
(45) Date of Patent: Sep. 20, 2005

(54) ONBOARD MONITORING DEVICE TO ENSURE SAFE DISEMBARKATION OF A TRANSPORTATION MEANS

(76) Inventor: Shih-Hsiung Li, 2F-7, No. 23, Sec. 1, Hangchow S. Rd., Taipei (TW)

( * ) Notice: Subject to any disclaimer, the term of this patent is extended or adjusted under 35 U.S.C. 154(b) by 0 days.

(21) Appl. No.: 10/945,629

(22) Filed: Sep. 20, 2004

(51) Int. Cl.[7] .............................................. H06F 17/00
(52) U.S. Cl. ......................................... 701/49; 348/148
(58) Field of Search ............................. 701/36, 45, 49, 701/51; 340/903, 435; 348/148

(56) References Cited

U.S. PATENT DOCUMENTS 6,411,901 B1 * 6/2002 Hiwatashi et al. .......... 701/301
6,515,378 B2 * 2/2003 Drummond et al. ....... 307/10.1
6,639,519 B2 * 10/2003 Drummond et al. ..... 340/815.4
6,799,107 B2 * 9/2004 Mushiake et al. ............ 701/49

* cited by examiner

*Primary Examiner*—Richard M. Camby
(74) *Attorney, Agent, or Firm*—Dellett & Walters

(57) ABSTRACT

An onboard monitoring device includes at least one image receiving device for receiving images coming from a rear of the vehicle, an image processing unit operateably connected to the at least one image receiving device to receive signals from the at least one image receiving device for analyzing the images so as to determine dimension change rate of the images based on velocities of the images, and a microprocessor operateably connected to the image processing unit so as to receive image signals from the image processing unit to determine locking status of the at least one vehicle door.

6 Claims, 6 Drawing Sheets

ONBOARD MONITORING DEVICE TO ENSURE SAFE DISEMBARKATION OF A TRANSPORTATION MEANS

BACKGROUND OF THE INVENTION

1. Field of the Invention

The present invention relates to an onboard monitoring device, and more particularly to an onboard monitor device that ensures safe disembarkation from a transportation means.

2. Description of Related Art

The slogan "Safety Comes First" normally means that the driver should develop good driving habits and obey the traffic regulations. Under the influence of the slogan, various onboard warning devices are invented to keep on warning the drivers to watch the road while driving. That is, people think most traffic accidents happen when the vehicle is moving on the road.

However, according to recent research, records show that the number of people stepping off a vehicle and getting hit by a passing vehicle is increasing and sometimes the number is even higher than the amount of people injured in highway accidents.

Drivers tend to think that when the vehicle has pulled over, the people onboard are safe from other vehicles. However, when the vehicle has pulled over, one side of the vehicle is still adjacent to the driving lane so that if a person gets off the vehicle without first checking if there is any passing vehicle, the person might easily be hit by the vehicle. Further, if the vehicle has not fully pulled over in a narrow road, small transportation devices such as scooters or motorbikes may easily pass the space between the vehicle and the shoulder. Under such a scenario, if a person gets off the vehicle without checking whether there is any passing vehicle, the person may easily be struck and injured.

Even when the person trying to get off a vehicle does check for passing vehicles, the person's vision is limited by the structure of the vehicle and can only peer out the rear window.

To overcome the shortcomings, the present invention tends to provide an improved onboard monitoring device to mitigate the aforementioned problems.

SUMMARY OF THE INVENTION

The primary objective of the present invention is to provide an improved onboard monitoring device to ensure safe disembarkation from a transportation means.

In order to accomplish the aforementioned objective, the onboard monitoring device has least one image receiving unit for receiving any incoming image with respect to the image receiving units, an image processing unit to process the image signal from the image receiving units, a microprocessor for receiving signals from the image processing unit and sending signals to at least one monitor and a linkage device to alternatively activate the door lock of the vehicle.

Other objects, advantages and novel features of the invention will become more apparent from the following detailed description when taken in conjunction with the accompanying drawings.

DETAILED DESCRIPTION OF THE PREFERRED EMBODIMENT

Figure 1:
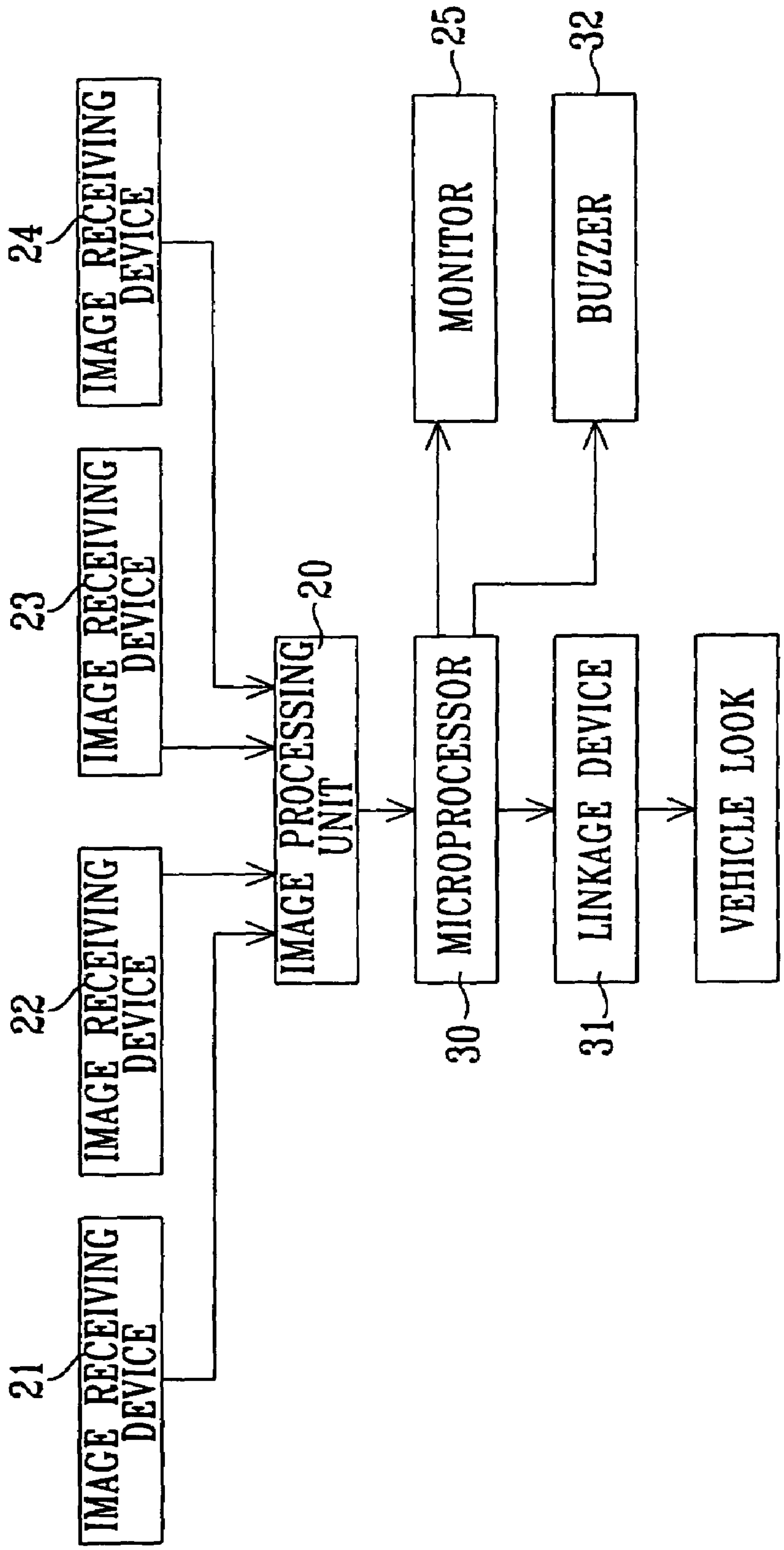
FIG. 1 is a block diagram showing the work flow of the onboard monitoring device of the present invention.

With reference to FIG. 1, it is noted that the onboard monitoring device in accordance with the present invention has at least one and as shown in the embodiment four image receiving devices (21,22,23,24), an image processing unit (20) for receiving and processing image signals from the image receiving devices (21,22,23,24), at least one monitor (25) in connection to the output of the image processing unit (20) to present an image processed by the image processing unit (20) for reference by passengers onboard the vehicle, a microprocessor (30) for receiving the processed image signal from the image processing unit (20) to determine whether there is any approaching object and the speed of the object, a linkage unit (31) operateably connected to the microprocessor (30) for alternatively activating door locks of the vehicle and a buzzer (32) operateably connected to the output of the microprocessor (30) to selectively send out a warning signal to the onboard passenger(s).

The image processing unit (20) is to process the image signals from the image receiving devices (21,22,23,24) to determine whether there is any object moving toward the image receiving devices (21,22,23,24). That is, after the image processing unit (20) is connected to the output of the image receiving devices (21,22,23,24) and if there is a rear approaching object with respect to the image receiving devices (21,22,23,24), according to the enlargement rate of the image in the image receiving devices (21,22,23,24), the incoming object's velocity is determined and thus the potential danger rate to the opening of the vehicle door is also determined. Thereafter, the judgement by the image processing unit (20) is sent to the microprocessor (30) and the monitor (25). The monitor (25) shows the incoming vehicle for reference to the onboard passenger(s) and the microprocessor (30), after receiving the signal from the image processing unit (20), alternatively activates the vehicle locking system to lock the vehicle doors to prevent the onboard passenger(s) getting off the vehicle when there is a high speed approaching object (vehicle) so as to ensure the safety of the onboard passenger. Also, the microprocessor (30) sends a signal to the buzzer (32) to give off an alarm to the onboard passenger to not open the vehicle door.

Figure 2:
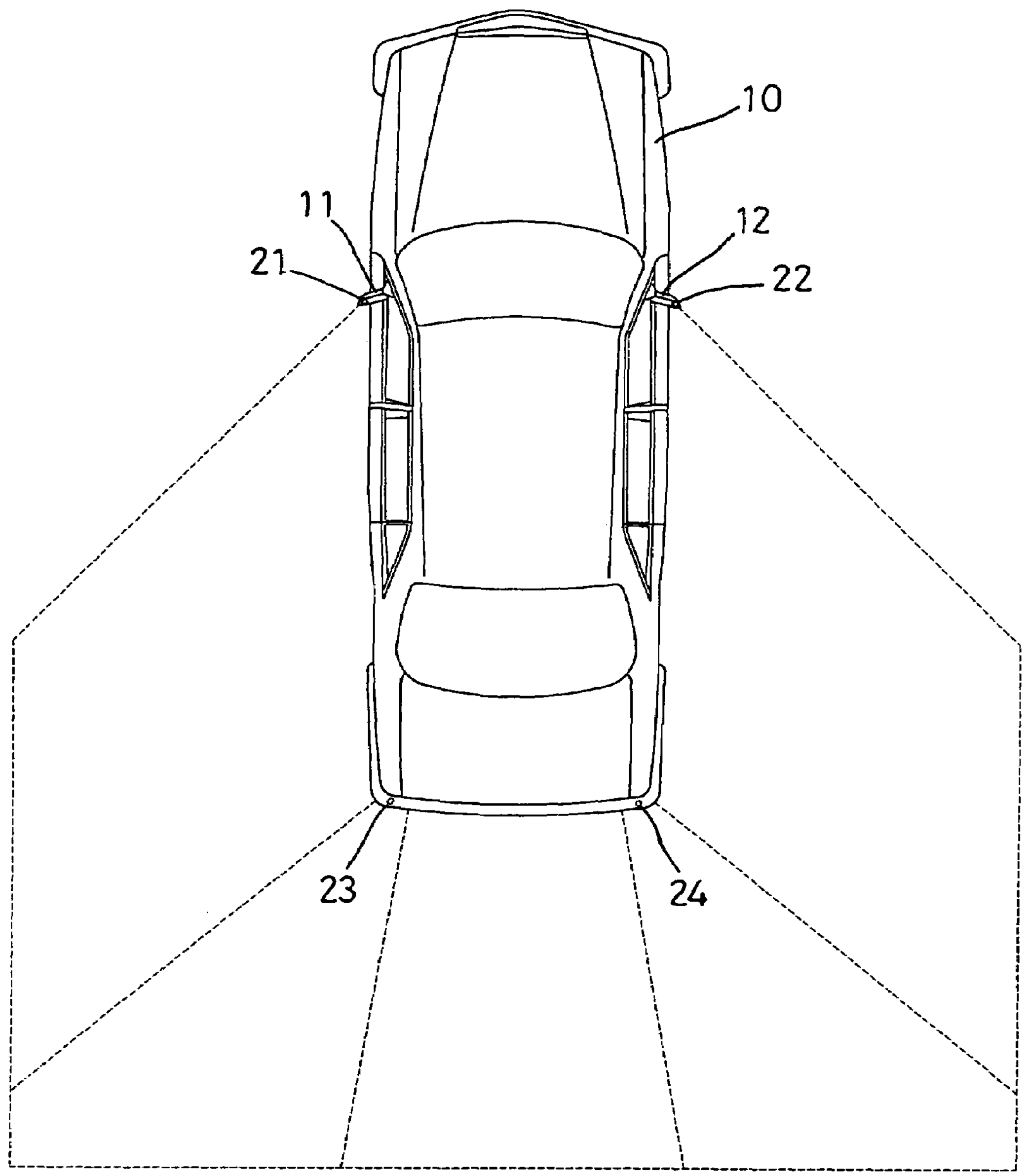
FIG. 2 is a schematic view showing the locations where the image receiving devices are mounted on a vehicle.
Figure 3:
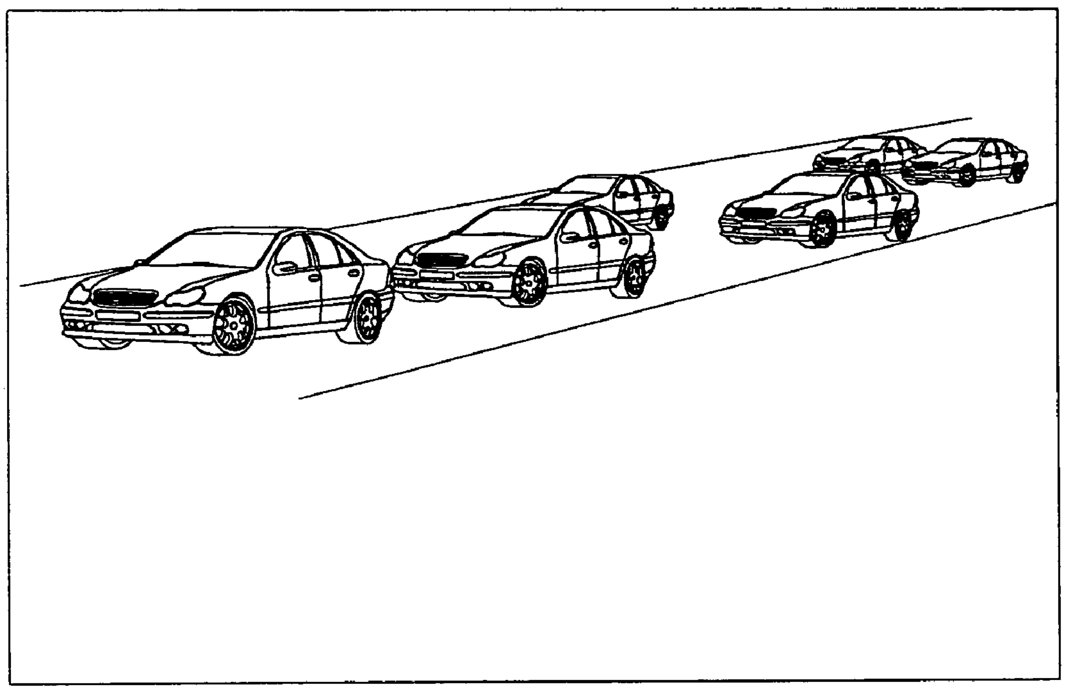
FIGS. 3 and 4 are schematic views showing images of incoming vehicles with respect to the image receiving devices.
Figure 4:
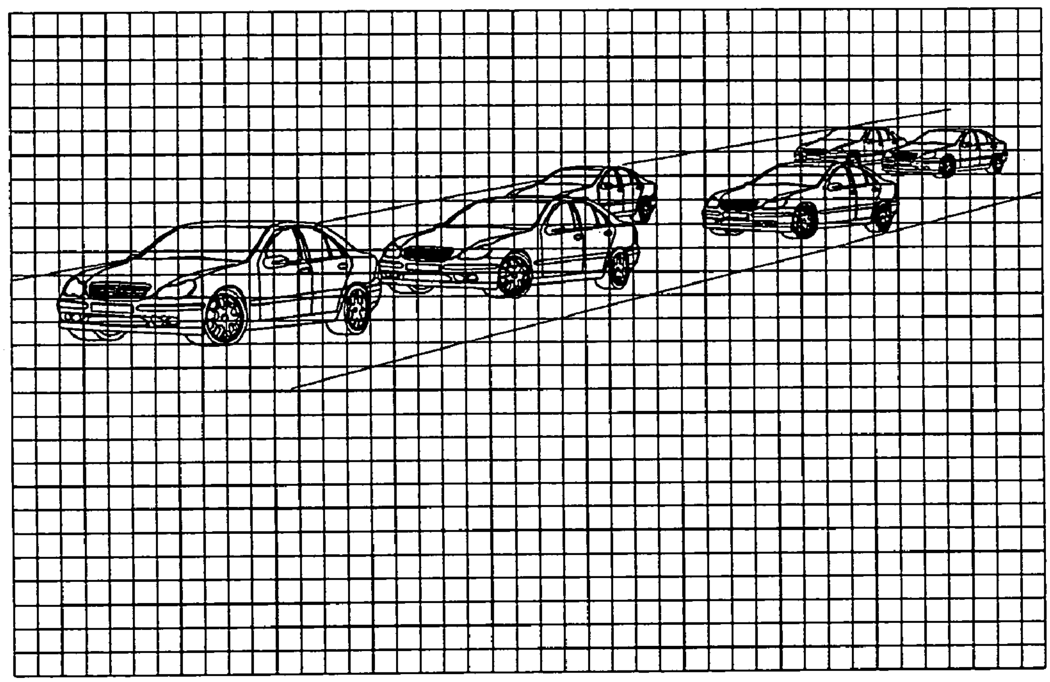
Figure 5:
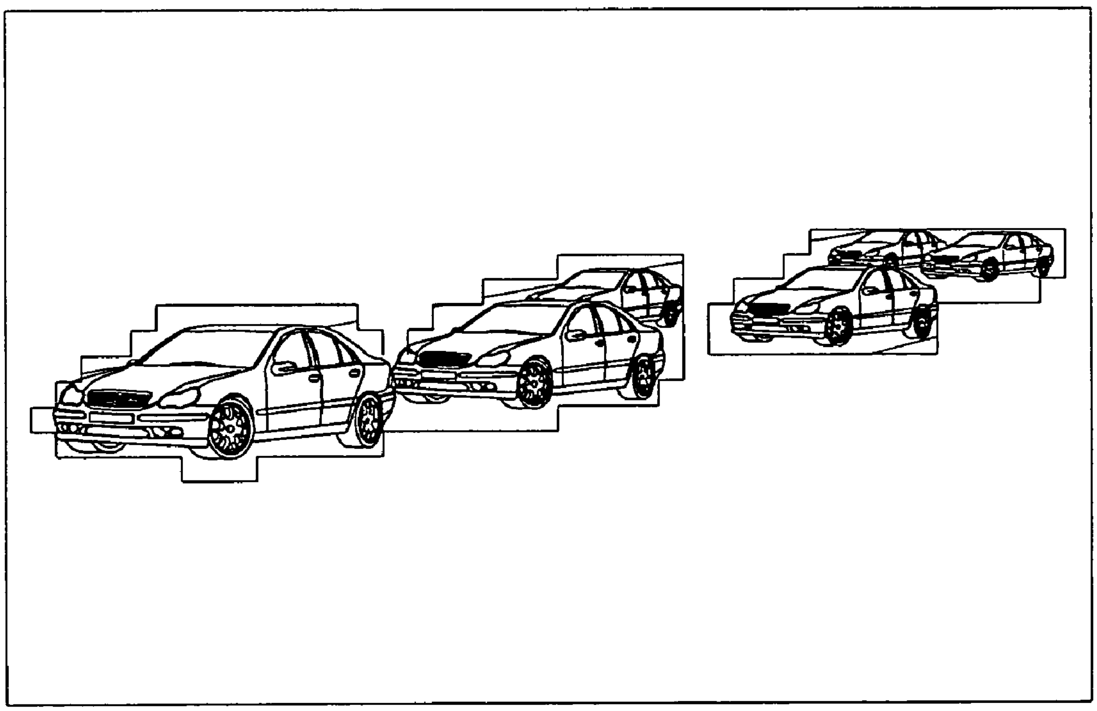
FIG. 5 is a schematic view showing how the images of incoming vehicles are adopted in relation to the image receiving devices of the present invention.
Figure 6:
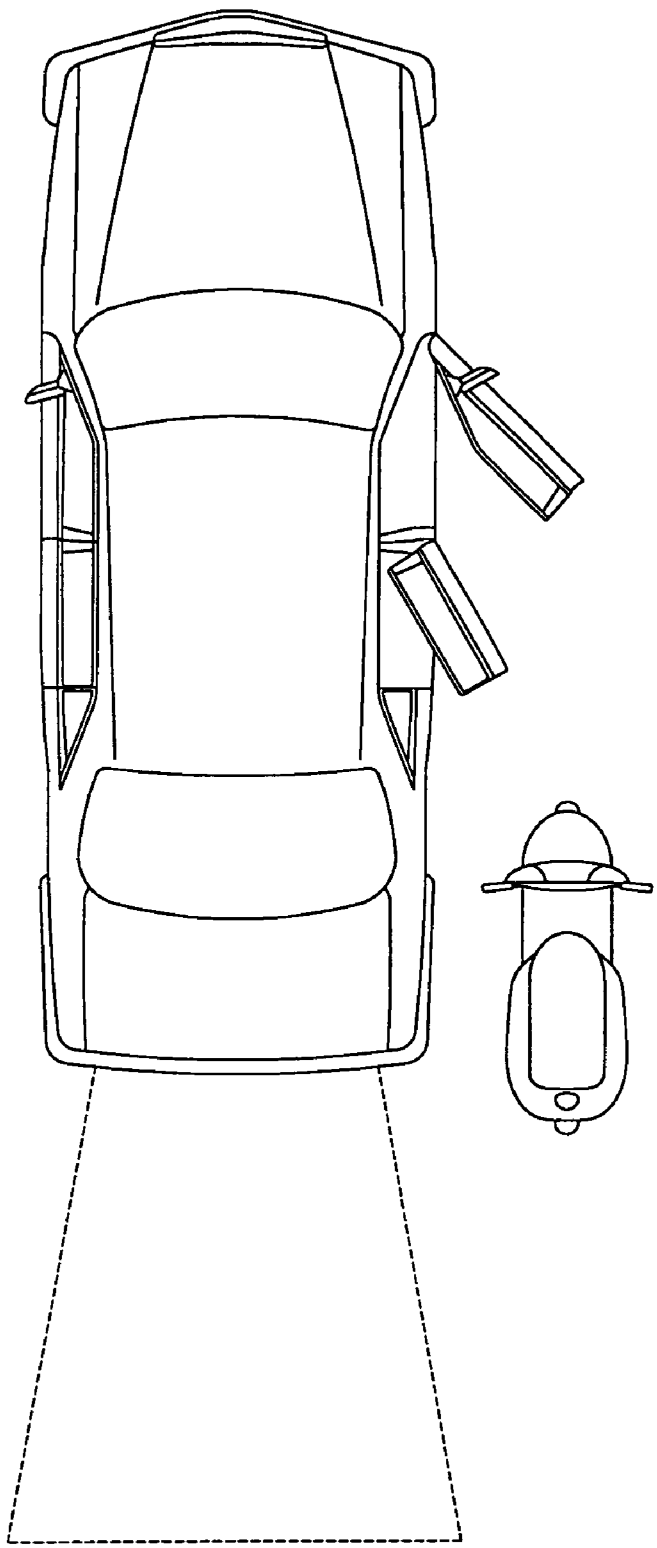
FIG. 6 is a schematic view showing the danger of a pulled-over vehicle if the vehicle is not fully on the shoulder.

With reference to FIGS. 2, 3 and 4 it is noted that two image receiving devices (21,22) are respectively mounted on two rearview mirrors (11,12) of a vehicle (10) and two more image receiving devices (23,24) are mounted on the vehicle's rear bumper (not numbered). Thus when the vehicle is stationary, an image received by the image receiving devices (21,22,23,24) within a very short period of time is still. In order to determine the difference between a moving object and a still object, the image processing unit (20) divides the image into frames such as what is shown in FIGS. 3 and 4. Thereafter, different frames are compared with themselves at different time intervals. Because the frames containing still objects, such as buildings, ads, trees, etc. corresponding to and being matched with one another continually, the frames containing still objects are deleted and only the frames with moving objects are retained, as shown in FIG. 5, for further processing.

The remaining frames are compared with one another in the image processing unit (20) to determine the dimension and velocity of the moving object(s) according to the image enlargement rate within a specified time interval. That is, if the dimension of the moving object is small, the moving object is not a threat to the opening of the vehicle door. However, if the image dimension change rate of the moving object is big, the signal that shows the moving object is approaching the image receiving devices (21,22,23,24) at high speed, such that opening the vehicle door might become dangerous and the passenger might be injured by the incoming vehicle, the image processing unit (20) sends out this message to the microprocessor (30).

The microprocessor (30) examines the vehicle door status at all times. After the microprocessor (30) receives the signal from the image processing unit (20), the buzzer (32) and the linkage device (31) are activated to send out a warning signal to the passenger and locks the vehicle lock respectively only when the threat is confirmed and sent by the image processing unit (20). As previously described, the microprocessor (30) monitors the vehicle doors at all times. That is, when any of the vehicle doors is about to be opened, the linkage device (31) mechanically sends out a signal to the microprocessor (30) to indicate that the vehicle door is about to be opened. While the microprocessor (30) is receiving the signal from the image processing unit (20), the microprocessor (30) compares the signals from the image processing unit (20) and the linkage device (31) to determine whether the timing for opening the vehicle's door has potential harm to the passenger.

From the aforementioned description, it is noted that due to the variation mounting locations of the image receiving devices (21,22,23,24), blind spots are eliminated while viewing the rear of the vehicle such that the onboard passenger is able to have sufficient information to determine whether the timing for opening the vehicle door is dangerous. Furthermore, with the work done by the image processing unit (20), the microprocessor (30) and the linkage device (31), the safety of the passenger trying to open the vehicle door is safely guarded.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An onboard monitoring device to ensure safe disembarkation of a transportation means having at least one door, the monitoring device comprising:

at least one image receiving device for receiving images coming from a rear of the transportation means;

an image processing unit operably connected to the at least one image receiving device to receive signals from the at least one image receiving device for analyzing the images so as to determine dimension change rate of the images based on velocities of the images; and a microprocessor operably connected to the image processing unit so as to receive image signals from the image processing unit to determine a locking status of the at least one vehicle door.

2. The onboard monitoring device as claimed in claim 1 further comprising a buzzer operably connected to the microprocessor so that after the microprocessor receives the signal from the image processing unit to indicate that timing for opening the at least one vehicle door is inappropriate, the buzzer sends out a warning signal.

3. The onboard monitoring device as claimed in claim 1 further comprising a linkage device operably connected to the microprocessor to be controlled by the microprocessor such that the microprocessor is able to control opening status of the at least one vehicle door via the linkage device.

4. The onboard monitoring device as claimed in claim 2 further comprising a linkage device operably connected to the microprocessor to be controlled by the microprocessor such that the microprocessor is able to control opening status of the at least one vehicle door via the linkage device.

5. The onboard monitoring device as claimed in claim 4, wherein at least one monitor is operably connected to the microprocessor to indicate the image signals from the image processing unit.

6. The onboard monitoring device as claimed in claim 5, wherein there are at least four image receiving devices.

* * * * *